(12) United States Patent
Ingerman

(10) Patent No.: US 12,166,900 B2
(45) Date of Patent: Dec. 10, 2024

(54) SYSTEMS AND METHODS FOR ELECTRONIC IDENTIFICATION OF OBJECTS WITH PRIVACY CONTROLS

(71) Applicant: Akamai Technologies, Inc., Cambridge, MA (US)

(72) Inventor: Mark M. Ingerman, Newton, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 246 days.

(21) Appl. No.: 17/659,189

(22) Filed: Apr. 14, 2022

(65) Prior Publication Data

US 2023/0336358 A1 Oct. 19, 2023

(51) Int. Cl.
*H04L 9/32* (2006.01)
*G06K 19/06* (2006.01)
*G06K 19/077* (2006.01)
*H04L 12/10* (2006.01)

(52) U.S. Cl.
CPC ...... *H04L 9/3247* (2013.01); *G06K 19/06056* (2013.01); *G06K 19/07758* (2013.01); *H04L 12/10* (2013.01)

(58) Field of Classification Search
CPC . H04L 9/3247; H04L 12/10; G06K 19/06056; G06K 19/07758; G06F 21/10; G06F 21/60

See application file for complete search history.

(56) References Cited

U.S. PATENT DOCUMENTS

| | | | |
|---|---|---|---|
| 7,124,943 B2 | 10/2006 | Quan et al. | |
| 8,055,898 B2 * | 11/2011 | Yamamura | H04L 9/3228 713/168 |
| 8,400,297 B2 | 3/2013 | Tuttle | |
| 8,909,735 B2 | 12/2014 | Swildens et al. | |
| 9,514,323 B2 * | 12/2016 | Mehring | G06F 21/10 |
| 9,911,016 B2 | 3/2018 | Ownby et al. | |
| 9,967,102 B2 * | 5/2018 | Osborne | H04L 9/0631 |
| 10,586,083 B2 | 3/2020 | Ownby et al. | |
| 10,699,178 B1 * | 6/2020 | Diorio | G06Q 10/087 |

(Continued)

FOREIGN PATENT DOCUMENTS

TW        I509571 B        11/2015

OTHER PUBLICATIONS

U.S. Appl. No. 17/077,209, filed Oct. 22, 2020 available in IFW.

(Continued)

*Primary Examiner* — Hosuk Song

(57) ABSTRACT

A physical object having a programmable, electronically readable tag can be identified and tracked in a given third party system with the aid of an identity services platform. When the owner of the object is about to place it in the custody of a third party system, the owner can use a client device to instruct the identity services platform to generate a nonce, for programming into the object's tag. Devices in the third party system read and use the nonce to identify and track the object and to make decisions about how it is handled. When the object exits from the control of the third party system for return to the owner, the identity services platform is asked to provide a proof of ownership to the third party system, which enables accurate return of the object to its proper owner.

15 Claims, 4 Drawing Sheets

(56) References Cited

U.S. PATENT DOCUMENTS

| | | |
|---|---|---|
| 11,038,694 B1* | 6/2021 | Kleinman ............. H04L 9/3236 |
| 11,232,340 B1* | 1/2022 | Diorio ................ G06K 7/10257 |
| 11,252,569 B2* | 2/2022 | Hoyer ................... H04W 12/10 |
| 11,297,055 B2* | 4/2022 | Momchilov ............ G06F 21/83 |
| 11,526,839 B2* | 12/2022 | Tennill ............... G06K 7/10099 |
| 11,812,842 B2* | 11/2023 | Perkins ............. G06K 19/0701 |
| 2009/0326685 A1 | 12/2009 | Meixner et al. |

OTHER PUBLICATIONS

Chen, W. et al., Machine translation of TW 1509751 B1, downloaded on Jun. 16, 2022, 6 pages.

Schuler, Mike "Hapag-Lloyd Launching Real-Time Monitoring for Its Entire Fleet of 3 Million TEU Containers", Online article, gCaptain Maritime News, downloaded Apr. 27, 2022 from https://gcaptain.com/hapag-lloyd-launching-real-time-container-monitoring/, Apr. 26, 2022,.

\* cited by examiner

SYSTEMS AND METHODS FOR ELECTRONIC IDENTIFICATION OF OBJECTS WITH PRIVACY CONTROLS

BACKGROUND

Technical Field

This patent document generally relates to computer hardware, software, and networking technologies, all used for identification and tracking of a physical object bearing an electronically programmable tag.

Brief Description of the Related Art

Baggage handling, inventory tracking, and package handling systems, among others, commonly use electronic scanners to identify and track objects as they move through the system. Bar codes and QR codes are well-known examples of optical machine-readable codes encountered for this purpose. Wirelessly-interrogated tags such as radio-frequency identification tags (RFID) are also common.

One situation in which an object needs to be identified and tracked is when an owner of a physical object (such as a piece of luggage or a shipment) gives that object over to an object identification system for handling (e.g., a baggage handling system, a delivery system). That system scans the object (may even provide the "tag" in the form of a temporary bar code) and associates it with the owner and where the object should be sent or otherwise how it should be handled. Second, an owner of a physical object (e.g., a company that rents cars, or tools) provides (rents) the object to someone else. Two examples are vehicle rentals and tool rentals. In this case, the owner runs the object identification system, with scans for checkout and checkin (and potentially intermediate scans, in the case of a vehicle, e.g., via GPS or other geolocation), and the owner is associating that tag temporarily with the renter.

While there are obvious benefits to being able to easily identify and track an object in the foregoing situations, in some cases there is an unnecessary level of private information and sensitive data being shared and managed in the tracking system. The identifier for the object typically is tied to personal information about the individual who owns or rents the object. Scans reveal information about the activities of those individuals. At the same time, if an identifier is persistent, etc., then there is the opportunity for errors, as one identifier could be associated with many people, or many different trips or transactions.

It is known in the art to provide re-programmable wireless tags, such that a new identifier can be written into the tag and then queried by a wireless scanner. With improving display technology, one can imagine a durable optical tag affixed to an object that could be programmed to change the displayed bar code or QR code. However, the mere capability of storing new identifiers does not solve the problem, because private information is still being overshared.

What is needed are systems and methods that enable data-protection oriented, privacy-centric identification and tracking of physical objects, preferably with the ability to easily identify who is associated with the object (or other sensitive metadata about the object). Preferably such systems and methods enable such functions to be rapid and ubiquitous, and available in many different kinds of locations and situations. The teachings of this patent document address these and other needs and have a variety of advantages that will become apparent to those skilled in the art upon review of the description that follows.

The teachings presented herein improve the functioning of a networked computing system itself, improving the ability to communicate data across systems while providing extra privacy protection in desirable ways. Those skilled in the art will understand these and other improvements from the teachings hereof.

BRIEF SUMMARY

This section describes some pertinent aspects of this invention. Those aspects are illustrative, not exhaustive, and they are not a definition of the invention. The claims of the issued patent define the scope of protection.

A physical object having an electronically programmable tag can be identified and tracked in a given third party system with the aid of an identity services platform. In one embodiment, when the owner of the object is about to place it in the custody of a third party system, the owner can use a client device (e.g., the owner's smartphone) to instruct the identity services platform to generate a nonce, which is then programmed into the object's tag (preferably wirelessly). Devices in the third party system read and use the nonce to identify and track the object and to make decisions about how it is handled, such as where the object is sent, and/or to record the services that have been applied to the object, or in any other way. Examples include periodic scans in a baggage handling system, shipping and logistics system, point-of-sale devices in rental or pooled resource arrangements, or time-based storage or parking arrangements. When the object exits from the control of the third party system for return to the owner, the identity services platform is asked to provide a proof of ownership to the third party system, which enables accurate return of the object to its proper owner. The owner's identity and related information is maintained in private by the identity services platform; only the nonce and the proof of ownership are provided externally to third parties. Each nonce is used temporarily, preferably being destroyed following the object's exit from a given third party system or otherwise after a time period or purge event.

The claims are incorporated by reference into this section, in their entirety.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, GraphQL, HTTP versions 1.1 and 2, HTTP over QUIC, MQTT, TCP/IP, and UDP, is assumed. Likewise, basic familiarity with well-known database technologies and terms, such as relational databases (RDBMS), SQL databases and queries, NoSQL databases and/or key-value approaches, is assumed.

All references to HTTP should be interpreted to include an embodiment using encryption (HTTP/S), such as when TLS secured connections are established. While context may indicate the hardware or the software exclusively, should such distinction be appropriate, the teachings hereof can be implemented in any combination of hardware and software. Hardware may be actual or virtualized.

Overview

Figure 1:
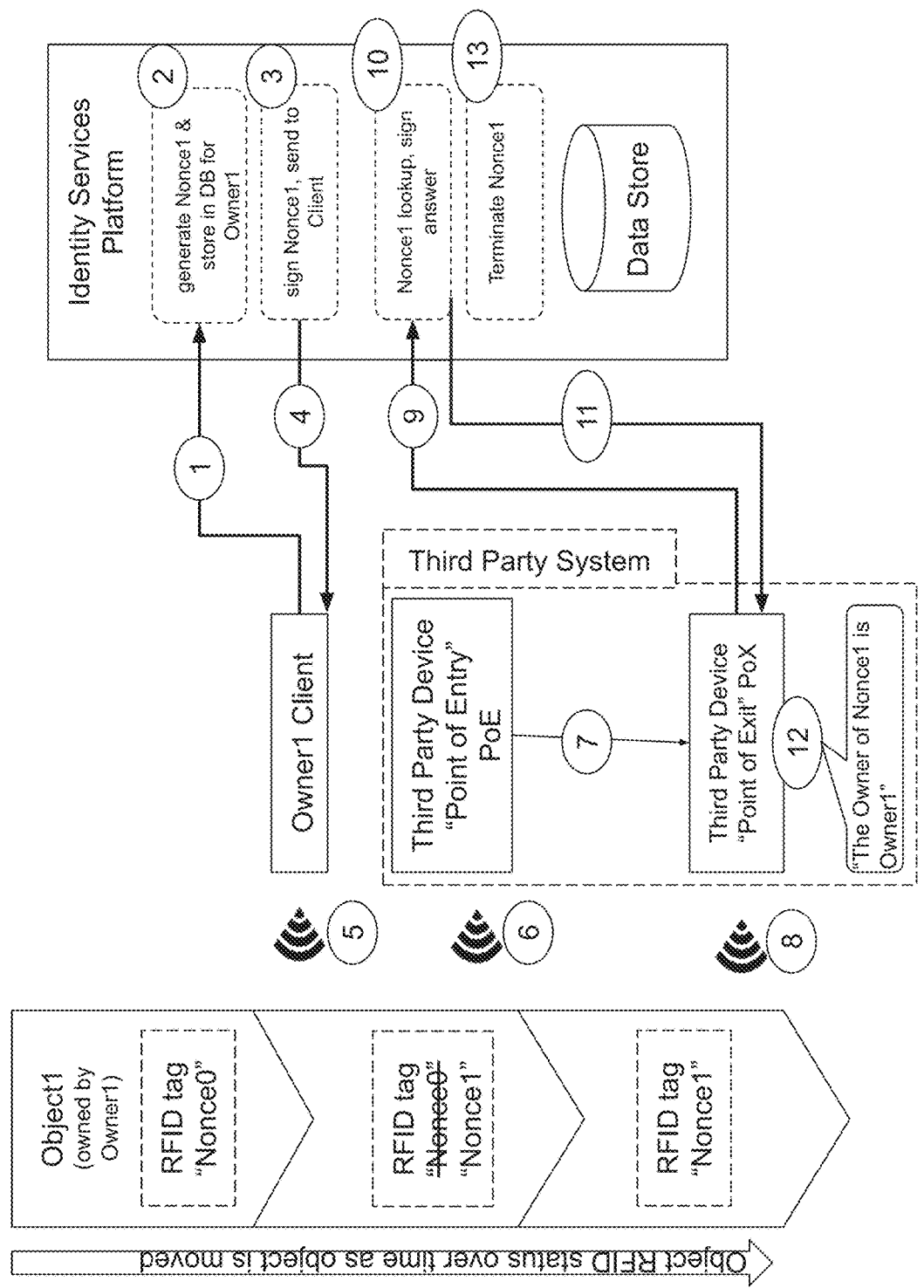
FIG. 1 is a block diagram illustrating a system in accordance with one embodiment of the teachings hereof.

FIG. 1 illustrates an embodiment of the system. The Identity Services Platform is essentially a platform-as-as-service (PaaS) comprised of one or more servers, preferably a distributed computing platform such as a CDN for performance and scale. The Identity Services Platform provides many points of presence around the Internet and its servers are reachable with low latency globally. It also provides data services in the form of a 'Data Store' in FIG. 1. The Data Store can be implemented as a database of any type, and may be realized using any known technology and may reside in many locations and provide the platform robust read/write access to data with replication and consistency characteristics.

'Owner1 client' represents a client application running on a client device, such as a smartphone, laptop, tablet, or other personal device. The Owner1 client could also be a shared device or browser application through which the Owner logs in and communicates to the Identity Services Platform.

The Third Party System in FIG. 1 represents virtually any kind of computer-based system used to scan, identify, track, inventory, or handle an object, and/or to direct or control such activities (of course not all systems necessarily provide all of the foregoing functions). One of the most basic functions that such a system has is the ability to identify an object at a given point, that is, it can be thought of as an 'object identification system'. Examples include luggage handling systems, e-claim check systems, vehicle rental, tool or other object rental systems, loan systems such as a library, parking garages, shipping and delivery systems. A variety of use cases will be described later.

FIG. 1 depicts the Third Party System as including a point of entry (PoE) device, which provides an initial scan of the object as the object enters the control of the Third Party System. A point of exit (PoX) device provides a final scan of an object as it leaves the Third Party System and is returned to the owner.

In many embodiments, the Third Party System comprises many other intermediate scanners, controllers, devices, or the like. However, this is not required as the invention accommodates systems of virtually any size and purpose.

Object1 shown on the left side of FIG. 1 represents a physical object owned by Owner1. Object1 contains an embedded tag that can be interrogated and programmed, such as a programmable radio frequency identification (RFID) tag. Programmable RFID tags are known in the art and any suitable implementation thereof can be used. Other kinds of tags that are programmable via near-field wireless communications or via cable (pluggable) are possible. Note that it is also possible to use an embedded electronic tag that is re-programmed with a temporary wireline connection, such as a USB port.

In connection with Object1, FIG. 1 has arrows pointing downwards to indicate the status of the Object1 overtime, and more specifically, the contents of Object1's RFID programmable memory. The arrows depict status as Object1 is within the third party system, traverses that system, and then is returned to Owner1.

Example of Operational Sequence

An operational example will now be described with reference to the numerical labels in FIG. 1.

Step 1 occurs when Owner1 is about to engage with the Third Party System. Owner1 uses the Owner1 client to send a nonce request to the Identity Services Platform (or more specifically, a particular server in the PaaS). The nonce request message can be implemented using conventional approaches such as an HTTP message. In addition to identifying Owner1, the nonce request message might include information about the Object1 and/or the Third Party System. Such information is useful for generating a nonce that is compatible, e.g., with supported format/length.

At step 2, the Identity Services Platform generates a nonce, which is shown as 'Nonce1' in FIG. 1. As those skilled in the art will understand, the term 'nonce' comes from the phrase "number used once" and refers to a unique number. In the context hereof, however, the nonce need not be limited to numbers. It can be any number, text character, symbol, or other value capable of being programmed into the Object1's RFID and compatible with the Third Party System. Also, the nonce need not be unique in an absolute sense, but rather created in such a manner that a collision between nonces is probabilistically infeasible in the context of the operation of the Identity Services Platform and the Third Party System. In other words, it should be highly unlikely that a duplicate nonce is used in the context of the methods and system shown in FIG. 1. For example, the nonce might be generated as a pseudorandom value falling in a large namespace and generated with a salt value taken from a timestamp or other Step 1 circumstances. Other examples include: generating a nonce based on a hash of a mac address (e.g., of the client device) with a timestamp, or based on attributes of the transaction (e.g., in the luggage example, using <carrier><flight><source-airport-code><dest-airport-code><sequence-number>). This last example enables the nonce to be used for routing information without tracking the route itself; the nonce essentially tells the destination airport system: this nonce is associated with this flight, and this flight arrived so, route luggage to the assigned bag claim for that flight.

Figure 2:
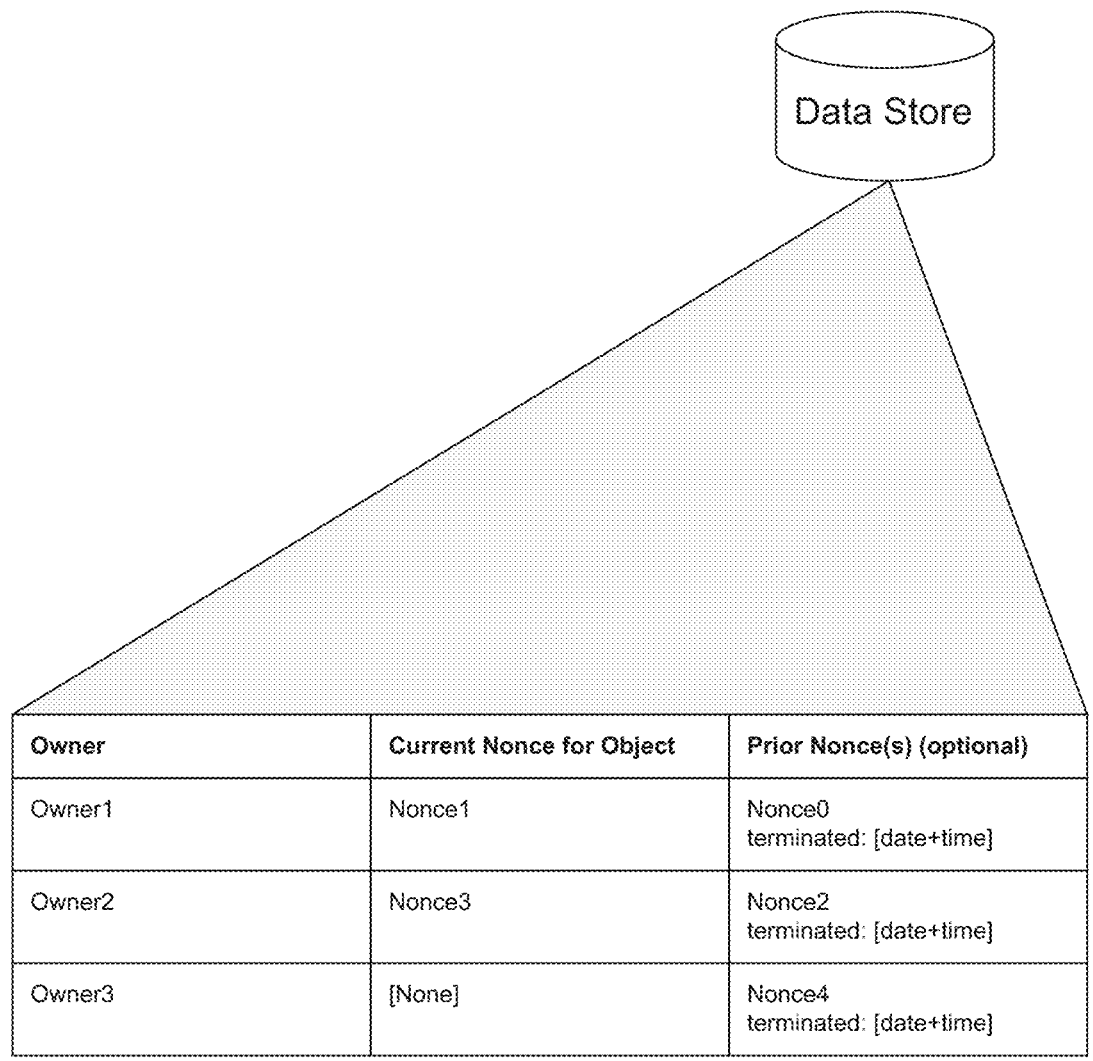
FIG. 2 is a diagram illustrating information in the data store shown in FIG. 1, in accordance with one embodiment.

Continuing with step 2, the Identify Services Platform stores the association between newly generated Nonce1 and the Owner1 in the Data Store. An example of the record in the Data Store is shown by FIG. 2. FIG. 2 also shows example data from other hypothetical users of the Identity Services Platform (Owner2, Owner3), since Identity Services Platform is intended to be multi-tenant.

In FIG. 2, nonce1 is stored as the current nonce for Owner1's Object. Of course, any number of Owner1's objects could appear in the Data Store, with a distinct nonce generated for each one. FIG. 2 includes an optional column for prior nonces corresponding to Object1. A number of historical nonces could be stored for error recovery or other purposes, with older nonces expiring after a limited time period (in some use cases) or being kept in perpetuity (in other use cases). However, the current example assumes that the current nonce for a given object is deleted as soon as Object1 is returned to the Owner or otherwise discharged from the Third Party System.

Returning to FIG. 1, after completing step 2, the Identity Services Platform executes step 3. In step 3 the Identity Services Platform signs Nonce1 so that its authenticity can be cryptographically proven (as a valid nonce from the Identity Services Platform).

For example, public key cryptography can be used: the Identity Services Platform can encrypt the nonce (or a hash of it) using its private key and attach it as a signature to the nonce, then, any other entity wishing to verify the signed nonce uses the Identity Services Platform's publicly available key to decrypt the signature and check that the nonce value (or hash thereof) is the same. This is but one example.

At step 4, the Identity Services Platform returns signed Nonce1 to Owner1's client, e.g., in the header field or body of an HTTP reply 200 'ok' message.

At step 5, Owner1 uses the Owner1 client to program the newly generated and signed Nonce1 into the programmable RFID tag embedded in the Object1. The example shown in FIG. 1 indicates that initially the RFID tag stored a previously used Nonce0, which is now overwritten by Nonce1.

Step 6 represents an initial scan of the RFID tag as the Third Party System begins to interact with the Object1. As noted, this is referred to as the point of entry (PoE) into the Third Party System and the device that conducts this initial scan is referred to in FIG. 1 as the PoE device.

Step 7 represents the path of Object1 within or while subject to the Third Party System. More detail will be provided later in connection with example use cases, but step 7 might include any number of intermediate scans of the RFID tag to obtain Nonce1. Typically Nonce1 would be associated with some record, policy, or manifest indicating how the Third Party System is supposed to handle the Object1 (e.g., what location it goes to, when it will be picked up). Notably, the identity of Owner1 is not stored or used in the Third Party System, barring some extraordinary circumstance or need for such information.

Step 8 occurs when Object1 is at the point where it will leave or otherwise cease interaction with the Third Party System. The final scan is conducted by the "point of exit" or PoX device. In many use cases Object1 is in the custody of the Third Party System from step 6 to 8 and so after step 8, the Third Party System must return Object1 to Owner1. Because Object1 bears no identifying information, but rather just Nonce1, the Identity Services Platform provides a service by which the Third Party System is provided with a proof that Object1 belongs to Owner1 (e.g., the person who is picking up Object1). This proof of ownership service will now be described.

In step 9, the PoX device of the Third Party System contacts the Identity Services Platform, e.g., with an HTTP message directed to a well-known hostname or address for the service. (Such hostname or address could be attached to the signed Nonce1, in some embodiments.) The PoX device sends Nonce1 to the Identity Services Platform—or more specifically, to a server therein.

At step 10, the Identity Services Platform looks up Nonce1 in the Data Store to find that the owner is Owner1. If no owner is found, of course, the Identity Services Platform can return an error to the PoX device.

Assuming Owner1 is found for Nonce1 then at steps 11 and 12 the Identity Services Platform provides a proof of ownership. The proof of ownership may take a variety of forms. In this embodiment, the Identity Services Platform sends a signed message identifying the owner who is associated with Nonce1 (that is, the message is signed using the same public-private key cryptography approach outlined earlier). The PoX device is thus able to decrypt the answer (identifying Owner1) using the public key. That information can be presented on a user interface for verification against the Owner1 forms of identification.

In another embodiment, Owner1 presents themselves to an individual associated with the third party. The Identity Services Platform can send a temporary code to both the PoX device (for display) and the Owner1 client device (for display) simultaneously. The individual is able to verify that the codes match and releases Object1 to Owner1. An advantage of this approach is that the identity of the owner of Object1 never needs to be sent to the PoX device.

In yet a further embodiment, the "code-matching" approach outlined above can be used, but in an automated manner. That is, Owner1 obtains the code from the Owner1 client device and enters it into an automated kiosk that is coupled to the PoX device. The kiosk releases Object1 to Owner1 upon determining that the codes match.

Alternatively, it is possible to have a manual verification of the owner. The owner can present identification to an individual associated with the third party system (e.g., present a driver's license to a counter agent). The agent can look up the owner via API call to the Identity Services Platform and find the current nonce, which enables location and/or verification of the proper luggage for the owner).

As noted at step 13, the process ends with the Identity Services Platform deactivating Nonce1 upon successful return of Object1 to Owner1. As previously mentioned, Nonce1 may be retained for some limited period of time, or deleted immediately from the Data Store. The Identity Services Platform may prompt Owner1 for confirmation before proceeding to deactivate or delete Nonce1.

Programmable Tags

In the embodiment shown in FIG. 1, and described above, the programmable tag was an RFID tag. However, a wide variety of tags can be used. The tag should be capable of being embedded in or attached to an object, and be programmable with read/write capability. Wireless interrogation and programming are preferred.

Other examples of suitable tags are:
a. A bluetooth-enabled tag that can store an identifier (the nonce) and upon interrogation provide it to a scanning device. This would be powered by a small battery.
b. A Wifi-enabled tag that can be programmed with an SSID (the nonce) and upon interrogation provide it to a scanning device. This would be powered by a small battery.

Use Cases

The system and methods disclosed herein can be applied to a wide variety of use cases. Included below are several examples, which are not meant to be exhaustive nor to be limiting.

Luggage

In this use case, the object is a piece of luggage that an owner drops off with a transportation provider, e.g., an airline, bus, or operator. The owner might be a passenger who presents their luggage for scan at the ticket counter. The owner programs a new nonce into the luggage before providing it to the counter agent. The transportation provider's baggage handling system (which would be the third party system in this instance) handles the luggage on the basis of the programmed nonce, transporting the luggage to baggage pickup at the destination. The owner can prove ownership of the luggage using the techniques described above.

E-Claim Check

This use case is similar to the luggage use case, except that the object is a piece of luggage, clothing, package, or other item that will be temporarily placed in the custody of a third party entity-such as a hotel or claim check desk—for temporary storage. The third party system in this case would be the inventory control system of the hotel/claim check desk.

A variant of this use case is placing an object in a long-term storage facility or service (e.g., documentation retention facilities, warehouse storage, vehicle and boat storage, etc.). The third party system is the inventory control system of the facility/service.

Shipping

In this use case, the object is a package that a sender gives to a carrier for delivery to an address. The sender corresponds to the owner in FIG. 1. The third party system is the package handling and logistics system used by the carrier, with the initial scanner being the PoE device and the destination scan occurring with the PoX device. In this use case, the nonce could be associated with both a sender and a recipient.

Another shipping-related use case involves the use of a freight container (e.g., intermodal container, sea shipping container, bulk shipment container). An RFID tag can be attached to such a container and for each shipment a new nonce is generated in accordance with the owner of the contents. The logistics systems used by the various shippers that handle the container would correspond to the third party system.

Parking Garage or Tollway

An owner's vehicle can be embedded with an RFID tag. Upon entering a certain area where a vehicle is tracked, such as a parking garage or tollway, the RFID tag can be programmed with the nonce, and the newly generated nonce can be scanned for tracking purposes. When the vehicle leaves the facility or area, an exit scan of the RFID tag tells the third party system that the vehicle is leaving and that the vehicle (known only by the nonce) should be billed for usage. The bill for the use of the road or facility can then be presented.

Rental Systems

Figure 3:
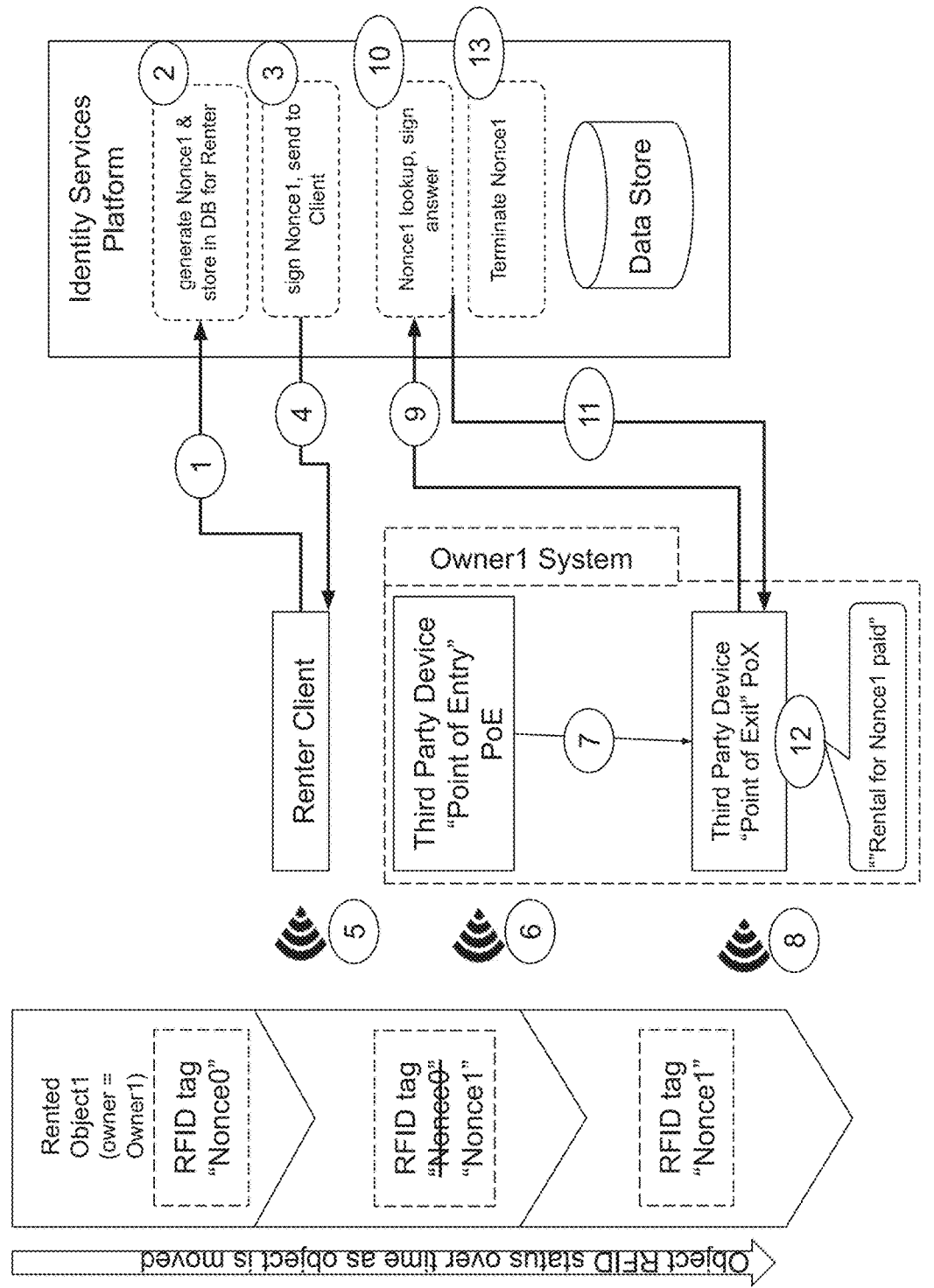
FIG. 3 is another block diagram illustrating a system in accordance with one embodiment of the teachings hereof; and, FIG. 4 is a block diagram illustrating hardware in a computer system that may be used to implement the teachings hereof.

A rented object can be embedded with the RFID tag. This embodiment is shown in FIG. 3. FIG. 3 is similar to FIG. 1 but relates to a "rented object" that is owned by Owner1. Tool rentals are one example of a rented object.

Referring to FIG. 3, Owner1 operates or uses an "owner1 system" to monitor usage of the items that they've rented out. At step 5, the individual or entity renting the object (labeled "renter" in FIG. 3) loads a nonce (validated by the PoE device) into the RFID tag of the rented object. Owner1 is able to track usage of the rented object (status, location, etc) while in the care of the renter.

When time comes for the object to be returned, there is a final PoX scan at step 8. The Identity Service Platform is notified at step 9, and in response finds the renter information based on the nonce. The Identity Services Platform could return the identity of the renter to the Owner1 system at step 11. However, in a preferred embodiment shown, which is illustrated in FIG. 3, at step 9 the PoX device sends up not only the nonce but also the amount due for the rental. The Identity Services Platform not only finds the renter information but also acts as a payment processor, charging the renter the amount due, for subsequent remittance to Owner1. Then in step 12 the Identity Services Platform returns a message confirming that the rental has been paid for. In this way, the Owner1 System does not see renter information at all. The technique has an additional advantage in that the use of a new nonce for every rental provides a way to disambiguate between rentals.

If Owner1 has an exceptional need to find out who is a renter of a given object, it might be possible for the Identity Services Platform to be queried for the renter information. But assuming things go smoothly, the identity of the renter need not be entered to the system that is checking in and out the object.

Notably, the rented object can be a vehicle and/or motorized equipment. If the rented object is a vehicle, one can imagine intermediate scans (e.g., for a toll road or to check in/track on the location of the vehicle). These intermediate scans would return the nonce, so that the itinerary of the individual renting the vehicle is not associated with that data, for privacy purposes.

Shared/Pooled Resources

In some cases, a group of companies or other organizations may decide to share or pool resources. Every time that an organization "checks out" one of the resources, a new nonce can be generated for tracking the usage during that time. This use case is similar to the rental use case.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 4:
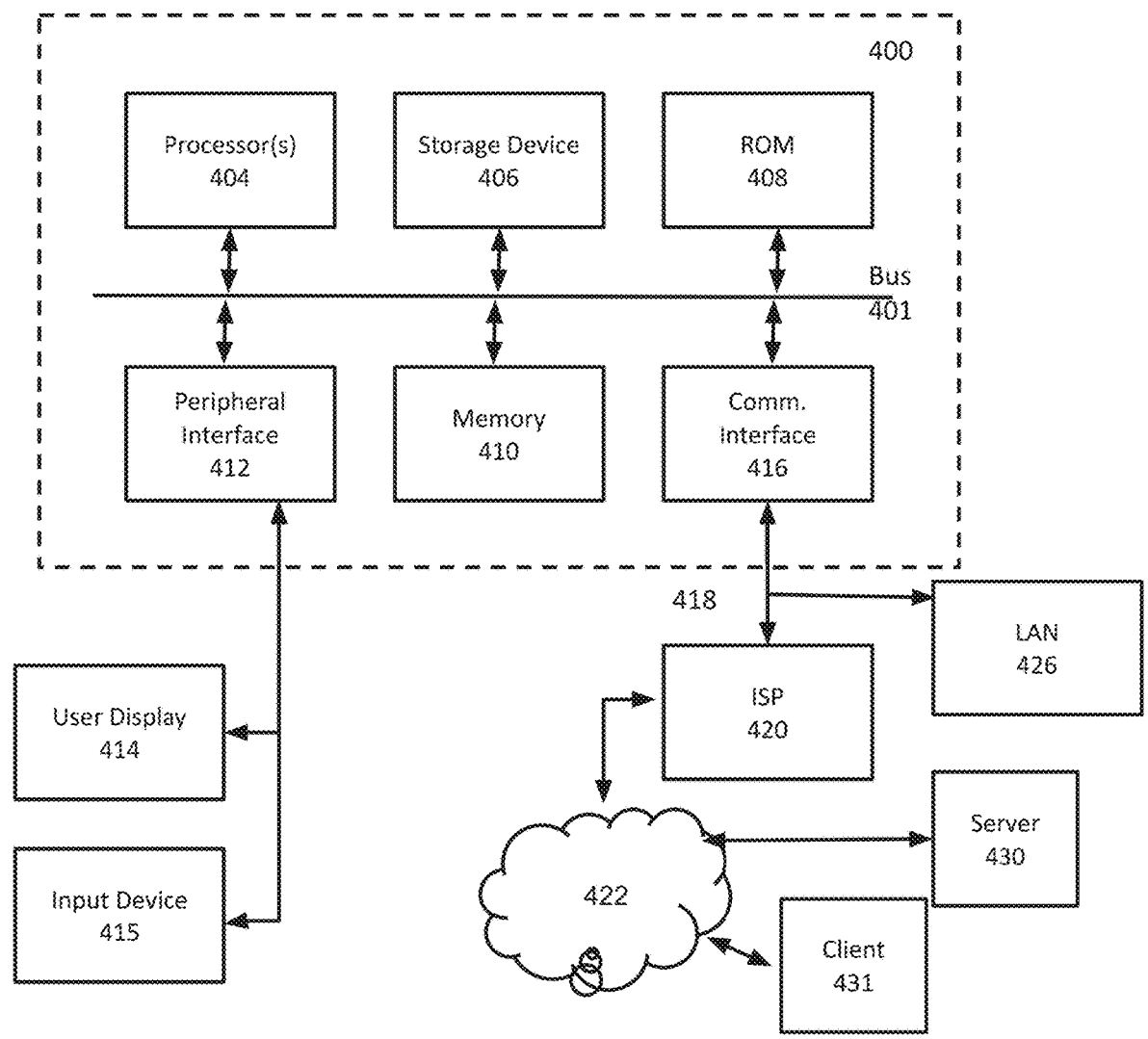

FIG. 4 is a block diagram that illustrates hardware in a computer system 400 upon which such software may run in order to implement embodiments of the invention. The computer system 400 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 400 includes a microprocessor 404 coupled to bus 401. In some systems, multiple processor and/or processor cores may be employed. Computer system 400 further includes a main memory 410, such as a random access memory (RAM) or other storage device, coupled to the bus 401 for storing information and instructions to be executed by processor 404. A read only memory (ROM) 408 is coupled to the bus 401 for storing information and instructions for processor 404. A non-volatile storage device 406, such as a magnetic disk, solid state memory (e.g., flash memory), or optical disk, is provided and coupled to bus 401 for storing information and instructions. Other application-specific integrated circuits (ASICs), field programmable gate arrays (FPGAs) or circuitry may be included in the computer system 400 to perform functions described herein.

A peripheral interface 412 may be provided to communicatively couple computer system 400 to a user display 414 that displays the output of software executing on the computer system, and an input device 415 (e.g., a keyboard, mouse, trackpad, touchscreen) that communicates user input and instructions to the computer system 400. However, in many embodiments, a computer system 400 may not have a user interface beyond a network port, e.g., in the case of a server in a rack. The peripheral interface 412 may include interface circuitry, control and/or level-shifting logic for local buses such as RS-485, Universal Serial Bus (USB), IEEE 1394, or other communication links.

Computer system 400 is coupled to a communication interface 416 that provides a link (e.g., at a physical layer, data link layer) between the system bus 401 and an external communication link. The communication interface 416 provides a network link 418. The communication interface 416 may represent an Ethernet or other network interface card (NIC), a wireless interface, modem, an optical interface, or other kind of input/output interface.

Network link 418 provides data communication through one or more networks to other devices. Such devices include other computer systems that are part of a local area network (LAN) 426. Furthermore, the network link 418 provides a link, via an internet service provider (ISP) 420, to the Internet 422. In turn, the Internet 422 may provide a link to other computing systems such as a remote server 430 and/or a remote client 431. Network link 418 and such networks may transmit data using packet-switched, circuit-switched, or other data-transmission approaches.

In operation, the computer system 400 may implement the functionality described herein as a result of the processor executing code. Such code may be read from or stored on a non-transitory computer-readable medium, such as memory 410, ROM 408, or storage device 406. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 418 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A system, comprising:
an identity services platform;
a client device associated with an owner of a physical object with an embedded identification tag that is electronically readable and writable;
an object identification system, distinct from the identity services platform, and comprising at least: (i) a device at a point of entry into the object identification system (PoE device) for reading the embedded identification tag in the physical object upon entering the object identification system, and (ii) a device at a point of exit from the object identification system (PoX device) for reading the embedded identification tag in the physical object upon exiting the object identification system; and,
the identity services platform comprising one or more servers programmed to:
generate a nonce upon request from any of: the client device and the PoE device,
associate the nonce with the owner and store that association,
send the nonce to at least one of the client device and the PoE device, to be written into the embedded identification tag of the physical object, and
in response to receiving the nonce from the PoX device, provide an indication of the owner based at least in part on the stored association between the nonce and the owner to any of: (a) the PoX device and (b) the client device.

2. The system of claim 1, wherein the nonce is cryptographically signed by the identity services platform.

3. The system of claim 1, wherein the embedded identification tag is wirelessly readable and writable.

4. The system of claim 1, wherein the embedded identification tag comprises a radio frequency identification tag.

5. The system of claim 1, wherein the indication of the owner comprises at least one of:
   (i) an identification of the owner that is cryptographically signed by the identity services platform, and,
   (ii) a temporary code sent to both the PoX device and the client device.

6. The system of claim 1, wherein the object identification system comprises at least one of the following:
   (i) a luggage handling system;
   (ii) a shipping or package delivery system;
   (iii) an object rental system; and,
   (iv) a vehicle tracking system.

7. The system of claim 1, wherein the nonce is generated upon request from the client device.

8. A system, comprising:
   an identity services platform;
   an object identification system, distinct from the identity services platform, and comprising at least: (i) a device at a point of entry into the object identification system (PoE device) for reading an embedded identification tag in a physical object upon entering the object identification system, and (ii) a device at a point of exit from the object identification system (PoX device) for reading the embedded identification tag in the physical object upon exiting the object identification system;
   wherein the embedded identification tag is electronically readable and writable, and an owner of the physical object operates the object identification system; and,
   the identity services platform comprising one or more servers programmed to:
      generate a nonce upon request from any of: the PoE device or a renter's client device,
         associate the nonce with the renter of the physical object, and store that association,
         send the nonce to at least one of the PoE device and the renter's client device, to be written into the embedded identification tag of the physical object, and
         in response to receiving the nonce from the PoX device, provide at least one of:
            an identification of the renter, and
            a proof of payment by the renter for renting the physical object.

9. The system of claim 8, wherein the nonce is cryptographically signed by the identity services platform.

10. The system of claim 8, wherein the embedded identification tag is wirelessly readable and writable.

11. The system of claim 8, wherein the embedded identification tag comprises a radio frequency identification tag.

12. The system of claim 8, wherein, in response to receiving the nonce from the PoX device, the identity services platform is programmed to provide:
   a proof of payment by the renter for renting the physical object.

13. The system of claim 8, wherein the nonce is generated upon request from the renter's client device.

14. A method operable in an identity services platform, comprising:
   generate a nonce upon request from any of: a client device and a PoE device,
      wherein the client device is associated with an owner of a physical object with an embedded identification tag that is electronically readable and writable, and the PoE device comprises a device at a point of entry into an object identification system for reading the embedded identification tag in the physical object upon entering the object identification system, and
      wherein the object identification system is distinct from the identity services platform;
   associate the nonce with the owner and store that association;
   send the nonce to at least one of the client device and the PoE device, to be written into the embedded identification tag of the physical object; and
   in response to receiving the nonce from a PoX device, provide an indication of the owner based at least in part on the stored association between the nonce and the owner to any of: (a) the PoX device and (b) the client device,
      wherein the PoX device comprises a device at a point of exit from the object identification system (PoX device) for reading the embedded identification tag in the physical object upon exiting the object identification system.

15. A method operable in an identity services platform, comprising:
   generate a nonce upon request from any of: a PoE device or a renter's client device;
      wherein the PoE device comprises a device at a point of entry into an object identification system (PoE device) for reading an embedded identification tag in a physical object upon entering the object identification system, and wherein the embedded identification tag is electronically readable and writable, and an owner of the physical object operates the object identification system, and,
      wherein the object identification system is distinct from the identity services platform;
   associate the nonce with the renter of the physical object, and store that association;
   send the nonce to at least one of the PoE device and the renter's client device, to be written into the embedded identification tag of the physical object; and,
   in response to receiving the nonce from a PoX device, provide at least one of:
      an identification of the renter, and
      a proof of payment by the renter for renting the physical object;
   wherein the PoX device comprises a device at a point of exit from the object identification system (PoX device) for reading the embedded identification tag in the physical object upon exiting the object identification system.

* * * * *